United States Patent
Hahn et al.

(10) Patent No.: US 7,023,838 B1
(45) Date of Patent: Apr. 4, 2006

(54) METHOD AND COMMUNICATION SYSTEM FOR HANDLING A PACKET SERVICE

(75) Inventors: Wolfgang Hahn, Bergfelde (DE); Frank Mademann, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 682 days.

(21) Appl. No.: 09/625,543

(22) Filed: Jul. 25, 2000

(30) Foreign Application Priority Data

Jul. 26, 1999 (DE) .................. 199 33 222

(51) Int. Cl.
*H04L 12/56* (2006.01)
*H04L 12/66* (2006.01)

(52) U.S. Cl. .............. 370/352; 370/401; 370/466

(58) Field of Classification Search ........ 370/352–356, 370/466, 467, 400, 401
See application file for complete search history.

(56) References Cited

U.S. PATENT DOCUMENTS

| 6,587,457 B1 * | 7/2003 | Mikkonen | 370/356 |
| 6,594,276 B1 * | 7/2003 | Le | 370/465 |
| 6,608,832 B1 * | 8/2003 | Forslow | 370/353 |

FOREIGN PATENT DOCUMENTS

| WO | WO 98/19438 | 5/1998 |
| WO | WO 99/01991 | 1/1999 |

OTHER PUBLICATIONS

End-to-End QoS Provisioning in Multimedia Wireless/Mobile networks Using an Adaptive Framework—Naghshineh et al—XP-000723638—1997 IEEE.

* cited by examiner

*Primary Examiner*—Chau Nguyen
*Assistant Examiner*—Soon D. Hyun
(74) *Attorney, Agent, or Firm*—Morrison & Foerster LLP

(57) ABSTRACT

The invention is directed to a method and to a communication system for handling a packet service with a packet-based core communication network (CNW) and an access communication network (ANW). According to the invention, the transmission of multimedia data in the packet data can be controlled by the edge node (EN) arranged at an interface between the core communication network (CNW) and an access communication network (ANW) and can be integrated into the data transmission from and to the mobile communication device (MS) via the air interface of the access communication network. The advantage of the invention is that the edge node enables an active intervention into the signalling of the transmission of the multimedia data as packet data, i.e., this signalling need no longer ensue transparently to the mobile communication device. Another advantage is that, due to the integration of the control of the multimedia data transmission, the data streams can be adapted better to the radio resources and/or to the demands made of the mobile communication device.

12 Claims, 2 Drawing Sheets

METHOD AND COMMUNICATION SYSTEM FOR HANDLING A PACKET SERVICE

BACKGROUND OF THE INVENTION

1. Field of the Invention

The invention is directed to a method and to a communication system for handling a packet service with a packet-based core communication network and a connecting communication network.

2. Description of the Related Art

It is well known to transmit data to and from a communication equipment as packet data according to a packet service either only in a line-bound communication network or only in a communication network with radio interface. The architecture for handling the packet service assumes that a connecting communication network with a radio interface exists that services the mobile communication terminal device used by a subscriber and makes the wireless transmission of data in both transmission directions available. Over and above this, an access of the connecting communication network is needed to a packet-based core communication network (e.g., the Internet) that at least partly transmits the data as packet data and supports a specific packet data protocol (e.g., the Internet protocol).

According to WO 99/01991 A2 (e.g., page 11, lines 17–26), a mobilization station MS is supplied in normal fashion by addressing its radio network address with an IP packet packaged (page 11, lines 25–26) in a tunnel (transparent tube, page 11, line 17).

One problem in the handling of packet services according to the above architecture is that the signalling of a packet data transmission from the core communication network to the mobile communication device and vice versa is routed transparently. Matching the data streams to the available radio resources of the connecting communication network and/or to the demands of the mobile communication device is not possible. This has an especially disadvantageous effect when broadband services with multimedia data are to be services via the radio resources that are usually in short supply and therefore expensive.

SUMMARY OF THE INVENTION

The invention is therefore based on the object of specifying a method and a communication system for handling a packet service with which an optimally efficient usage of the packet data transmission is also achieved for mobile communication devices.

This object is achieved by a method for handling a packet service, comprising the steps of transmitting data over a part of a packet-based core communication network as packet data, wirelessly transmitting the packet data from and to a mobile communication device via an access communication network with an air interface, controlling a transmission of multimedia data in the packet data by an edge node arranged at an interface between the core communication network and the access communication network, and integrating the multimedia data, by the edge node, into the data transmission from and to the mobile communication device via the air interface of the access communication network.

This object is also achieved by a communication system for handling a packet service, comprising a packet-based core communication network for a partial transmission of data as packet data, an access communication network having an air interface for wireless transmission of the packet data from and to a mobile communication device, an edge node arranged at an interface between the core communication network and the access communication network for controlling a transmission of multimedia data in the packet data and for integration into the data transmission from and to the mobile communication device via the air interface of the access communication network.

According to the invention, the control node arranged at the interface between the core communication network and the connecting communication network allows the transmission of multimedia data in the packet data to be controlled and to be integrated into the data transmission from and to the mobile communication device via the radio interface of the connecting communication network. The advantage of the invention is that the control node enables an active intervention into the signalling of the transmission of the multimedia data as packet data, i.e., this signalling no longer need ensue transparently to the mobile communication device. Another advantage is that the integration of the control of the multimedia transmission into the functions of the connecting communication network with radio interface allows the data streams to be matched better to the radio resources and/or to the demands made of the mobile communication device.

According to a development of the invention, the control node checks the packet data for their content. The knowledge of the type of transmitted packet data—particularly multimedia data—makes it easier for the control node to control and execute specific services. Thus, specific treatments can ensue, individual charge billings can be implemented, and subscriber-related and/or network-related services can be initiated for individual multimedia data streams.

According to another development of the invention, a multimedia access controller identifies the presence of multimedia data and assigns corresponding radio resources of the connecting communication network for the transmission of the multimedia data via the radio interface.

The multimedia access controller preferably controls a setup and cleardown of carrier channels according to the radio resources needed for the transmission of the packet data. Thus, the entire bandwidth of the available carrier channels can be utilized for a real-time transmission of broadband multimedia data (Internet protocol bearer) as packet data, in contrast to where one part of the carrier channels suffices for the transmission of voice data as packet data.

A further beneficial development of the invention is that a signalling protocol of the packet-based core communication network is terminated by the control node and is mapped onto a signalling protocol of the access communication network with radio interface. It is thereby advantageous when at least a part of the signalling protocol of the core communication network is replaced by the signalling protocol of the access communication network.

BRIEF DESCRIPTION OF THE DRAWINGS

The invention is explained in greater detail below on the basis of an exemplary embodiment shown in the drawing.

DESCRIPTION OF THE PREFERRED EMBODIMENTS

Figure 1:
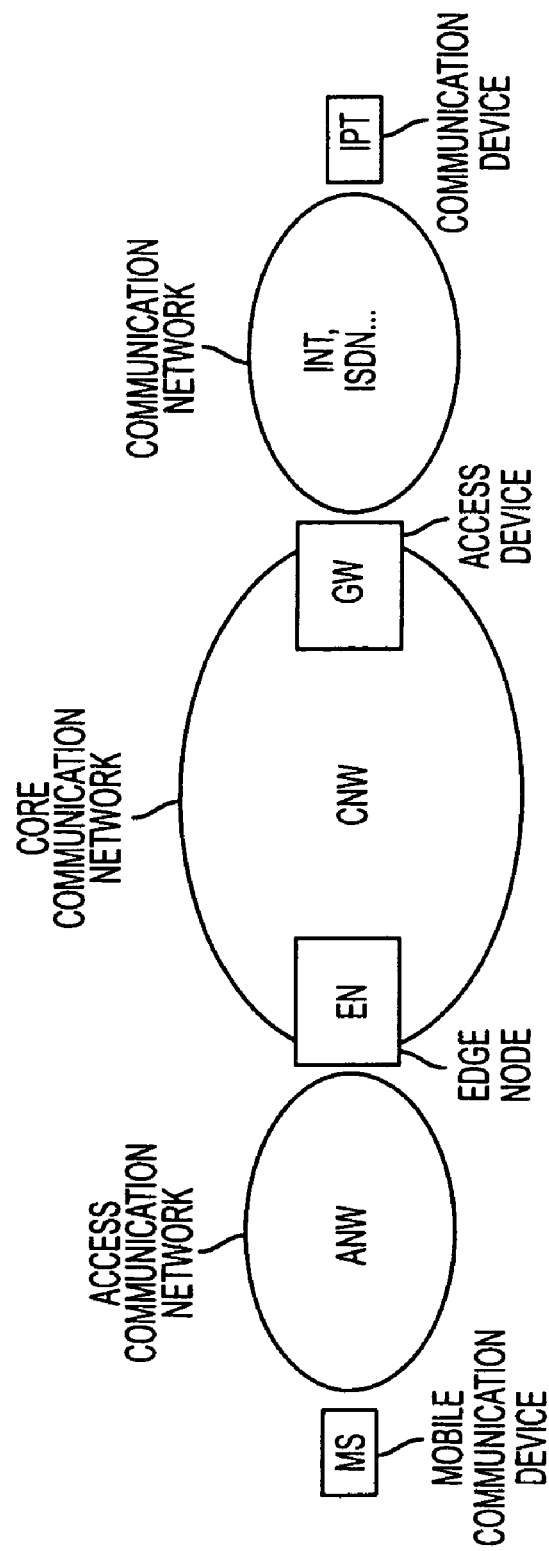
FIG. 1 is a block circuit diagram of the basic architecture of the communication system for handling a packet service.

The architecture of a communication system for handling a packet service is illustrated by FIG. 1, which shows a mobile communication device MS (e.g., a mobile station) usable by a subscriber and a connecting communication network ANW (access network) serving the mobile station and having a radio interface (air interface)—operated, for example, according to one of the known TDMA, CDMA or FDMA access methods or an arbitrary combination of the access methods derived from them—as the mobile radiotelephone-specific elements of the communication system. Connected the communication system are the packet service-specific elements of the communication system, composed of a packet-based core communication network CNW (core network) for the transmission of the packet data as well as of a packet data network INT (e.g., the Internet) with a further communication device IPT (for example, an Internet terminal) for the editing of the packet data. Alternatively to the packet data network INT, other communication networks, for example the line-switched network ISDN, could be connected with a corresponding communication device.

A control node EN (edge node) that controls the transmission of multimedia data in the packet data and is integrated into the data transmission from and to the mobile communication device MS via the air interface of the access communication network ANW is arranged at the interface between the core communication network CNW and the access communication network ANW. The edge node EN primarily enables a check of the packet data for their content, so that the control and implementation of certain services by the edge node is facilitated by the knowledge about the type of packet data transmitted—particularly given the presence of the multimedia data in the form of, for example, audio data and/or video data. Thus, specific actions can ensue, individual charge billings can be implemented, subscriber-related and/or network-related services can be initiated for individual multimedia data streams.

For example, the following can be applied:

subscriber-related services for the mobile subscriber using the communication device MS in case of voice transmission via the Internet (VoIP, voice over IP calls), as are likewise possible for line-switched voice transmission (circuit=switched calls), for example, supplementary services like call redirection, intelligent services, etc.;

network-related services such as, for example, priorities for network transport, routing, and reservation of resources.

The edge node EN of the communication network CNW servicing the mobile communication device MS and with access to the network ANW advantageously actively intervenes in the signalling for the multimedia data transmission, i.e., this signalling is not transparently forwarded to the communication device MS. With these information, the edge node EN controls existing or newly introduced network equipment such as, for example, a multimedia access means, including a transcoder and a multimedia access controller.

One or more access devices GW such as, for example, a switching equipment, a multimedia access device and a packet data access device that offer interfaces corresponding to the type of connected external network are present at the side of the network transition from the communication network CNW to the communication network INT, ISDN.

The particular advantages of the inventive architecture are comprised that the access communication network ANW with air interface is equated with a mobile radiotelephone network:

integration of the control of the packet data transmission, particularly of the multimedia data transmission, into functions of the mobile radiotelephone network;

at least a partial termination of multimedia protocols in the edge node EN and mapping onto mobile radiotelephone-specific signalling;

replacement and/or conversion of at least parts of the signalling protocol employed in the communication network CNW—for example, of the multimedia standard protocol H.323—by already existing functions of the mobile radiotelephone network—for example, of the existing signalling protocol—between the mobile communication device MS and the core communication network CNW;

mobile radiotelephone-specific transport protocols for signalling and data;

error-resistant encoding of synchronization information given different multimedia data streams;

employment of the network architecture both for the handling of voice services (VoIP) and the handling of packet services, particularly for the transmission of multimedia data in the packet data up to the mobile communication device;

mapping functions of the mobile radiotelephone network onto functions of the packet-based core communication network (CNW) and vice versa.

Figure 2:
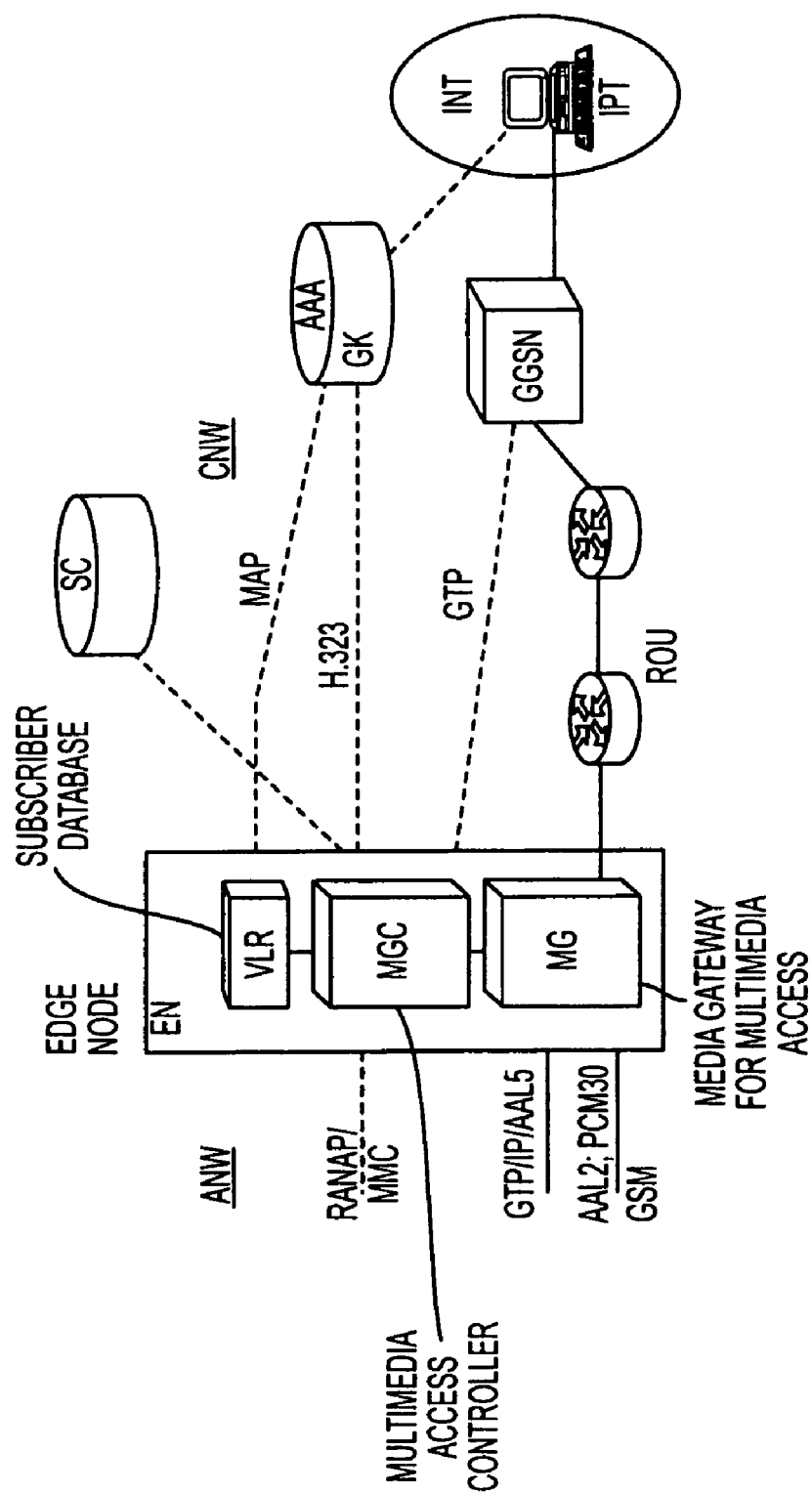
FIG. 2 is a schematic diagram showing the signalling and the transport of the packet data between the devices inventively involved in the handling of the packet service.

The block circuit diagram according to FIG. 2 shows the signalling (respectively shown as broken lines) and the transport of the packet data (respectively shown as uninterrupted lines) between the devices involved in the handling of the packet service. These are:

the access communication network ANW with the air interface to the mobile communication device (not shown). A signalling protocol RANAP (radio access network application part) for the mobile radiotelephone-specific functions and a multimedia protocol MMC (multimedia control) are thereby supported. The transport of the packet data ensues via various connections that can, on the one hand, be packet-based according to GTP (general packet radio system tunnel protocol) or IP (Internet protocol) or AAL5 (ATM adaptation layer No. 5) and, on the other hand, line-switched according to AAL2 (ATM adaptation layer No. 2) or according to PCM30 (pulse code modulation) or according to GSM (global system for mobile communication);

the edge node EN with a subscriber database VLR (visitor location register) for registering and storing data of mobile subscribers or, respectively, of mobile communication devices corresponding to a mobile radiotelephone network, with a multimedia access controller MGC (media gateway controller) for the implementation of the control function in the signalling path, and with a multimedia access device MG (media gateway) for the transport of the packet data in the connecting path. The multimedia access controller MGC identifies the presence of multimedia data in the received packet data and assigns corresponding radio resources of the access communication network ANW for the transmission of the multimedia data via the air interface. Furthermore, it controls the setup and cleardown of carrier channels according to the radio resources needed for the transmission of the packet data;

a service controller SC that is connected to the edge node EN in order—as an alternative to the multimedia access control means MGC—to control and initiate the implementation of the above-described services given knowledge of the multimedia data streams that, primarily, contain broadband data such as audio and video data;

a multimedia access device GK (gatekeeper) for the packet data signalling and the implementation of functions AAA such as authentification, authorization and accounting. In the present example, this multimedia access device GK enables an access to/from the Internet INT, including the communication device IPT, composed of an Internet terminal, and thereby supports the H.323 signalling protocol for multimedia data transmission in pure, IP-based (Internet protocol) networks. Furthermore, the multimedia access device GK can also support the MAP signalling protocol (mobile application part) that assumes and controls mobile radiotelephone network-specific functions;

a packet data access device GGSN (gateway GPRS service node) that enables the access from/to the core communication network CNW to/from the Internet INT, including the communication device IPT, composed of an Internet terminal, and thereby supports the GTP signalling protocol (GPRS tunnel protocol) for the transmission of packet data according to the GPRS service. The packet data transmission ensues via a tunnel, by which a switching to another tunnel is possible and a new transmission path through the communication network thereby arises;

one or more through-connect devices ROU in the form of routers or switching equipment for the transport of the packet data, particularly of the multimedia data, from/to the multimedia access device MG of the edge node EN.

For outgoing connections, the mobile communication device MS sets up a multimedia connection to the communication device IPT. The information about the multimedia data is contained in the signalling MMC between the communication device MS and the edge node EN. The complete standard protocol is set up from the edge node EN to the communication device IPT.

For multimedia connections to the mobile communication device MS, for example from the Internet INT, the IP address of the mobile communication device MS is determined via the corresponding access function associated with the access communication network ANW that, for example, is taken over from the access device GK (gatekeeper). A corresponding address of the edge node EN servicing the mobile communication device MS is thereby offered for the multimedia signalling. The edge node EN is thus in the position of recognizing, modifying, forwarding or terminating the multimedia control information.

For the transmission between the mobile communication device MS and the edge node EN, the signalling channel according to the signalling protocol RANAP present for the mobile communication device MS is expanded by the multimedia control information. In addition to the control possibility, a dependable transmission and a faster connection setup can thus be achieved.

In order to assure the quality of service (QoS), the edge node EN can remain as anchor in the connection as long as a multimedia data stream exists. When data streams are no longer present, a switch to another edge node can be undertaken given mobility of the subscriber using the communication device MS. Only the access device GGSN thereby remains fixed.

Due to the control of the multimedia signalling, the multimedia access device MGC can optimally adapt the setup and cleardown of carrier channels (bearer services) to the demands of the multimedia communication devices and to the existing radio resources of the access communication network ANW. By this, it is possible to employ the entire bandwidth of the available carrier channels: real-time IP channels via AAL5 but also line-switched voice channels via AL2 in case of only voice data transmission or connection handover in voice mobile radiotelephone networks with little bandwidth or limitation to voice because of a shortage of resources.

In addition to the multimedia transcoding in the access device MG, specific, lean protocol stacks that do not transmit specific layers on the air interface and thus truncate the packet header of the packet data in an advantageous way can be employed for real-time IP carrier channels.

An error-prone transmission of synchronization information can also be foregone when, given the presence of a plurality of multimedia data streams, these are synchronized in the access device MG. With respect to the cm means, the synchronizing information is re-attached at the network side, whereby the average fluctuations in running times and running times of the air interface are considered.

The knowledge of the existing multimedia data streams is utilized in the access controller MGC for the implementation of specific services. Without these multimedia information, the streams could only be distinguished from one another with reference to their bandwidth and other QoS parameters. Examples are supplementary services introduced in the GSM standard, IN services, etc. Likewise, different charging algorithms can be applied, for example, to bill voice according to time and video according to data volume.

The above-described method and communication system are illustrative of the principles of the present invention. Numerous modifications and adaptations thereof will be readily apparent to those skilled in this art without departing from the spirit and scope of the present invention.

What is claimed is:

1. A method for treatment of a packet service, comprising:
transmitting data across at least a portion of a packet-based core communications network as packet data;
wirelessly transmitting the packet data from and to at least one mobile communication device through a connection communications network with a wireless interface;
controlling transmission of multimedia data in the packet data by a control node arranged on an interface between the core communications network and the connection communications network, and integrating into the data transmission from and to the mobile communications device through the wireless interface of the connection communications network, wherein
for multimedia connections to the mobile communications device, an IP address of the mobile communications device is determined through an access function associated with the connection communications network, and a corresponding address of the control node serving the mobile communications device is made available for multimedia signaling.

2. The method according to claim 1, wherein the packet data are checked with regard to their content by the control node.

3. The method according to claim 2, wherein the presence of multimedia data is determined by a multimedia access control device, and corresponding wireless resources of the connection communications network for the transmission of the multimedia data are allocated through the wireless interface.

4. The method according to claim 2, wherein an assembly and disassembly of bearer channels corresponding to the wireless resources needed for the transmission of the packet data is controlled by the multimedia access control device.

5. The method according to claim 2, wherein for the event that multimedia data are present, a treatment specific to certain multimedia data flows is accomplished by the control node.

6. The method according to claim 5, wherein individual fee billing is completed for each of the multimedia data flows.

7. The method according to claim 5, wherein user-specific services are completed for each of the multimedia data flows.

8. The method according to claims 5, wherein network-specific services are completed for each of the multimedia data flows.

9. The method according to claim 1, wherein a signaling protocol of the packet-based core communication network is terminated by the control node and is imaged on a signaling protocol of the core communications network with wireless interface.

10. The method according to claim 9, wherein at least a portion of the signaling protocol of the core communications network is replaced by the signaling protocol of the connection communications network.

11. The method according to claim 1, wherein functions of the packet-based core communications network are imaged onto functions of the connection communications network with wireless interface, and vice-versa, by the control node.

12. A communications system for treatment of a packet service, comprising:
   a packet-based core communications network for at least partial transmission of data as packet data;
   a connection communications network with a wireless interface for the wireless transmission of the packet data from and to at least one mobile communications device;
   a control node arranged on an interface between the core communications network and the connection communications network for control of transmission of multimedia data in the packet data and for integration into the data transmission from and to the mobile communications device through the wireless interface of the connection communications network, wherein
   for multimedia connections to the mobile communications device, IP address of the mobile communications device can be determined through an access function associated with the connection communications network, and a corresponding address of the control node serving the mobile communications device is made available for multimedia signaling.

* * * * *